United States Patent
Grinchuk et al.

(10) Patent No.: US 7,171,047 B2
(45) Date of Patent: Jan. 30, 2007

(54) ADAPTIVE SEM EDGE RECOGNITION ALGORITHM

(75) Inventors: Mikhail Grinchuk, San Jose, CA (US); Lav Ivanovic, Cupertino, CA (US); Paul Filseth, Los Gatos, CA (US)

(73) Assignee: LSI Logic Corporation, Milpitas, CA (US)

( * ) Notice: Subject to any disclaimer, the term of this patent is extended or adjusted under 35 U.S.C. 154(b) by 788 days.

(21) Appl. No.: 10/327,452

(22) Filed: Dec. 20, 2002

(65) Prior Publication Data

US 2004/0120578 A1    Jun. 24, 2004

(51) Int. Cl.
*G06K 9/48* (2006.01)
(52) U.S. Cl. .................................... 382/199
(58) Field of Classification Search ............... 382/119, 382/199
See application file for complete search history.

(56) References Cited

U.S. PATENT DOCUMENTS

| | | | |
|---|---|---|---|
| 5,046,111 A * | 9/1991 | Cox et al. .................. | 382/143 |
| 5,497,007 A * | 3/1996 | Uritsky et al. ........... | 250/491.1 |
| 6,292,582 B1 | 9/2001 | Lin et al. | |
| 6,658,640 B2 | 12/2003 | Weed | |
| 6,757,645 B2 | 6/2004 | Chang et al. | |

OTHER PUBLICATIONS

Land, A.H. et al., "An Automatic Method of Solving Discrete Programming Problems," Econometrica, vol. 28, No. 3, Jul. 1960, pp. 497-520.
Little, John D.C. et al., "An Algorithm for the Traveling Salesman Problem," Operations Research, vol. 11, 1963, pp. 972-989.
Novikoff, A., "On Convergence Proofs for Perceptions," Proceedings of the Symposium on the Mathematical Theory of Automata, vol. XII, pp. 615-622.
Rosenblatt, F., "The Perceptron: A Probabilistic Model for Information Storage and Organization in the Brain," Psychological Review 65, pp. 386-408.

* cited by examiner

*Primary Examiner*—Joseph Mancuso
*Assistant Examiner*—Jonathan Schaffer
(74) *Attorney, Agent, or Firm*—Strategic Patent Group, Inc.

(57) ABSTRACT

A computer-implemented method is disclosed for recognizing edges in a digital image having a plurality of pixels with gray-scale values defining features. The method includes recognizing edges of the features by cearting a new image in which pixels in the new image corresponding to pixels in the gray-scale image that have a brightness value meeting a predetermined threshold are assigned a first binary value to represent edge regions, while remaining pixels in the new image are assigned a second value to represent both background and internal areas of the features. Area recognition is then performed to distinguish internal feature areas from background areas. The method further includes detecting edge lines from the edge regions that separate features from background and internal feature areas.

15 Claims, 10 Drawing Sheets

| 300 | 128 | B value of current pixel (xi, yi) | B values of pixels in same row & col. | B values of pixels in same diagonal | B values of pixels equidistance from current pixel |

ADAPTIVE SEM EDGE RECOGNITION ALGORITHM

FIELD OF THE INVENTION

The present invention relates to digital image analysis, and more particularly to a software program for detecting edges in a digital scanning electron microscope image for use during semiconductor fabrication processes.

BACKGROUND OF THE INVENTION

An integrated circuit is fabricated by translating a circuit design or layout to a semiconductor substrate. In optical lithography, the layout is first transferred onto a physical template, which is in turn, used to optically project the layout onto a silicon wafer. In transferring the layout to a physical template, a mask is generally created for each layer of the integrated circuit design. To fabricate a particular layer of the design, the corresponding mask is placed over the wafer and light is shone through the mask from the energy source. The end result is a semiconductor wafer coated with a photoresist layer having the desired pattern that defines the geometries, features, lines and shapes of that layer. The photolithography process is typically followed by an etch process during which the underlying substrate not covered or masked by the photoresist pattern is etched away, leaving the desired pattern in the substrate. This process is then repeated for each layer of the design.

Figure 1:
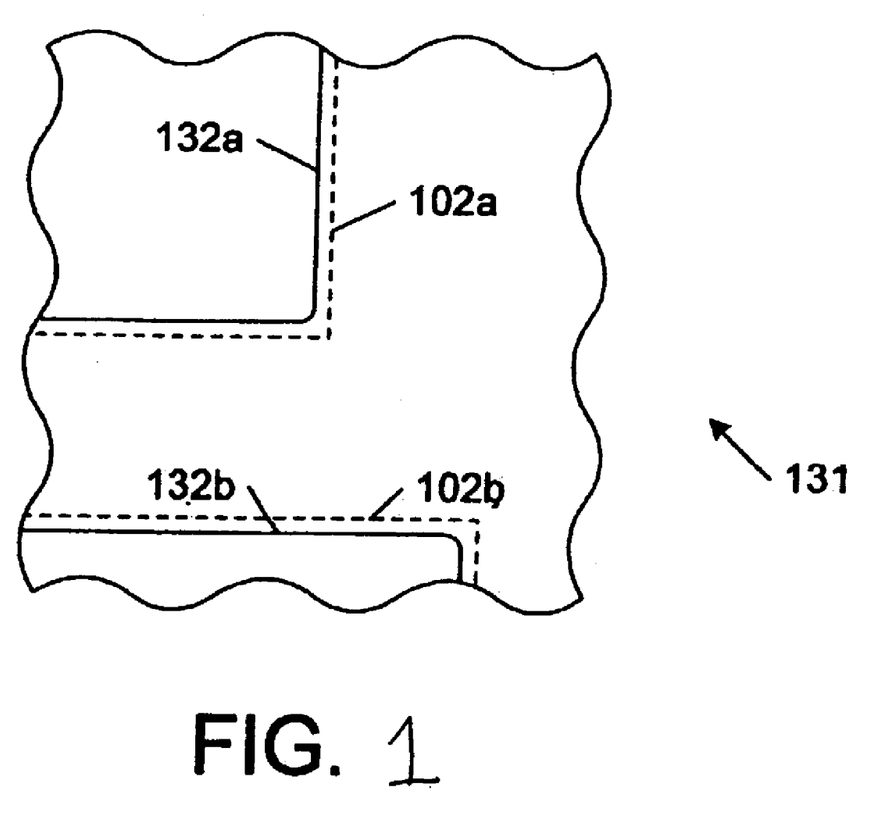
FIG. 1 is a diagram showing a portion of a desired semiconductor pattern and the patterned layer resulting from a masking process.

Referring now to FIG. 1, a portion of a desired semiconductor pattern and the patterned layer resulting from the masking process is shown. The semiconductor pattern shown in dashed lines includes various pattern elements 102a, and 102b (collectively referred to as pattern elements 102). Using the pattern, a masking process is used to create the patterned layer 131, comprising the actual elements 132. The patterned layer 131 may comprise, in alternative embodiments, a photoresist pattern produced by a photolithography process or a substrate pattern produced by an etch process.

As will be appreciated to those skilled in the art of semiconductor processing and design, elements 102 of semiconductor pattern includes various interconnect sections and pattern elements designed to achieve a desired function when the integrated circuit contemplated by the semiconductor fabrication process is completed. Typical elements 102 of a semiconductor pattern are substantially comprised of straight lines and square corners. For a variety of reasons, reproducing the exact image of semiconductor pattern in a production process is extremely complicated due to the large number of parameters associated with typical masking processes and further due to the unavoidable diffraction effects which inevitably result in some variations between the photomask used to produce a pattern and the pattern itself.

It is seen in FIG. 1 that the actual pattern 131 produced by a masking process varies from the desired semiconductor pattern 102. This discrepancy is shown in FIG. 1 as the displacement between the dashed lines of pattern elements 102a and 102b and the actual pattern elements 132a and 132b. Typically, the variations from the idealized pattern 102 include rounding of the corners and a shrinking of the line widths. It will be appreciated to those skilled in the art of semiconductor processing that variations from the desired semiconductor pattern can contribute to lower processing yields, reduced reliability, reduced tolerance to subsequent misalignment, and other undesired effects.

To analyze the pattern on the wafer, or the mask used to create the pattern, a scanning electron microscope (SEM) may be used to create a digital image of the wafer or mask. An SEM image is typically a gray-scale raster image, where each pixel position includes an integer value between 0 and 255 representing brightness or intensity. The patterned elements or features in the SEM image may have the same or different brightness levels as the background of the image, but the edges of the features appear as lines having different brightness levels than the internal feature areas and the background.

The use of SEM images has many applications in the field of masking process simulation. Masking process simulation software is commercially available that is capable of producing a simulated estimate of the pattern that would be produced by a specified masking process using a given photomask. Examples of process simulation software include TSUPREM-4™ and Taurus-LRC™ by Synopsys, Inc. of Mountain View, Calif. Masking process simulators are useful for generating a large quantity of information concerning the effects of modifying various parameters associated with the process.

Although simulation software is used to avoid the time and expense associated with producing actual test wafers, the simulator's estimate of the pattern, referred to as an aerial or latent image, usually varies from the actual pattern produced by the masking process (due to diffraction effects and variations in the masking process) regardless of the number of parameters incorporated into the simulator.

The Assignee of the present application has developed a process that improves the process simulator's prediction of the final pattern produced by a masking process by using the actual results generated by the masking process. For example, U.S. patent application Ser. No. 10/305,673, entitled "Automatic Calibration Of A Masking Process Simulator" (2631P) filed on Oct. 22, 2002. discloses a process that introduces a feedback mechanism into the simulation process whereby the discrepancies observed between the actual pattern and the aerial image are analyzed to produce a calibrated simulator that results in less discrepancy, or error between the aerial image produced during a successive iteration of the simulator and the actual image produced by the pattern.

The discrepancies between the actual pattern and the aerial image are observed by obtaining an SEM image of the pattern from a wafer, detecting the edges of the patterned features in the image, and comparing the detected edges to the aerial image. The simulator is then modified until it produces an aerial image that matches the detected edges with a minimum amount of error. Of course, the method used to detect or recognize the edges of the features of the SEM image is of utmost importance to ensuring the accuracy of the calibration process.

Accurate recognition of edges is usually implemented as a two-stage procedure: during the first stage, one has to find approximate locations of edges, and the second stage involves refining these locations. Stage one sometimes allows significant location errors (for example, up to 5 or 10 pixels), but the topology as a whole (i.e., set of separate edges with their mutual positions) must be detected without errors: edges must be continuous lines, without holes, no one edge can be lost, two separate edges cannot be merged, and so on.

Accordingly, what is needed is a more accurate method for finding the approximate locations of the edges in an SEM image during the first stage of edge recognition. The present invention addresses such a need.

SUMMARY OF THE INVENTION

The present invention provides a computer-implemented method for recognizing edges in a digital image having a plurality of pixels with gray-scale values defining features. The method includes recognizing edges of the features by creating a new image in which pixels in the new image corresponding to pixels in the gray-scale image that have a brightness value meeting a predetermined threshold are assigned a first binary value to represent edge regions, while remaining pixels in the new image are assigned a second value to represent both background and internal areas of the features. Area recognition is then performed to distinguish internal feature areas from background areas. The method further includes detecting edge lines from the edge regions that separate features from background and internal feature areas.

DETAILED DESCRIPTION

The present invention relates to a computer-implemented algorithm for detecting the approximate locations of edges in a digital image. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 2:
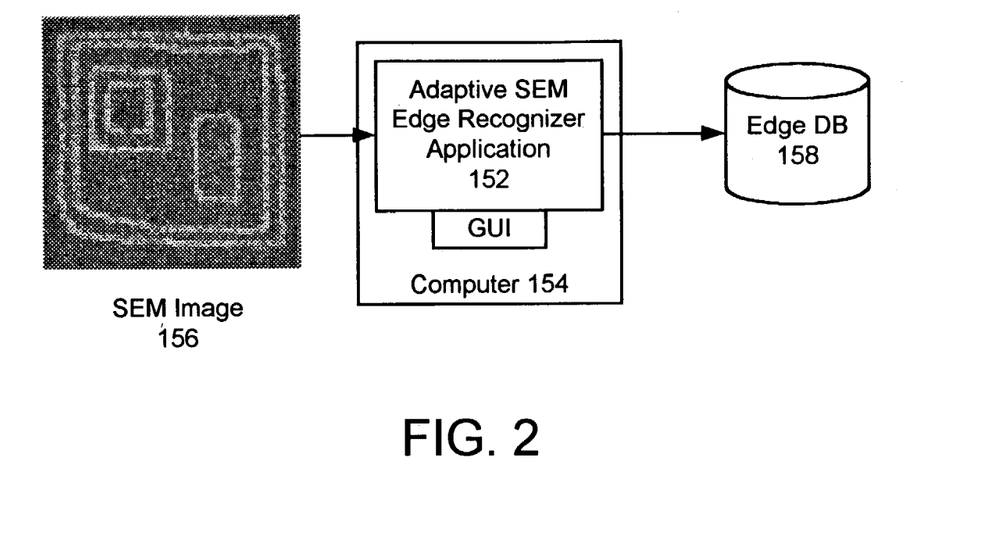
FIG. 2 is a block diagram illustrating an adaptive SEM edge recognition system in accordance with a preferred embodiment of the present invention.

FIG. 2 is a block diagram illustrating an adaptive SEM edge recognition system in accordance with a preferred embodiment of the present invention. The system 10 preferably includes an adaptive SEM edge recognizer software application 152 that executes on a general-purpose computer 154, such as PC, workstation, or a server. The adaptive SEM edge recognizer application 152 receives a digitized SEM image 156 as input, and detects the approximate location of edges of the pattern in the SEM image 156 using pattern recognition algorithms. The final result of the edge recognition algorithm 152 is a set of lines representing feature edges that separate background areas from the features in the remainder of the SEM image 156. The edge lines may then be stored in an edge database 158, preferably in a standard format, such as GDSII (a standard file format for transferring/archiving graphic design data). The adaptive SEM edge recognizer application 152 implements an adaptive SEM edge recognition process, as described further below.

Figure 3:
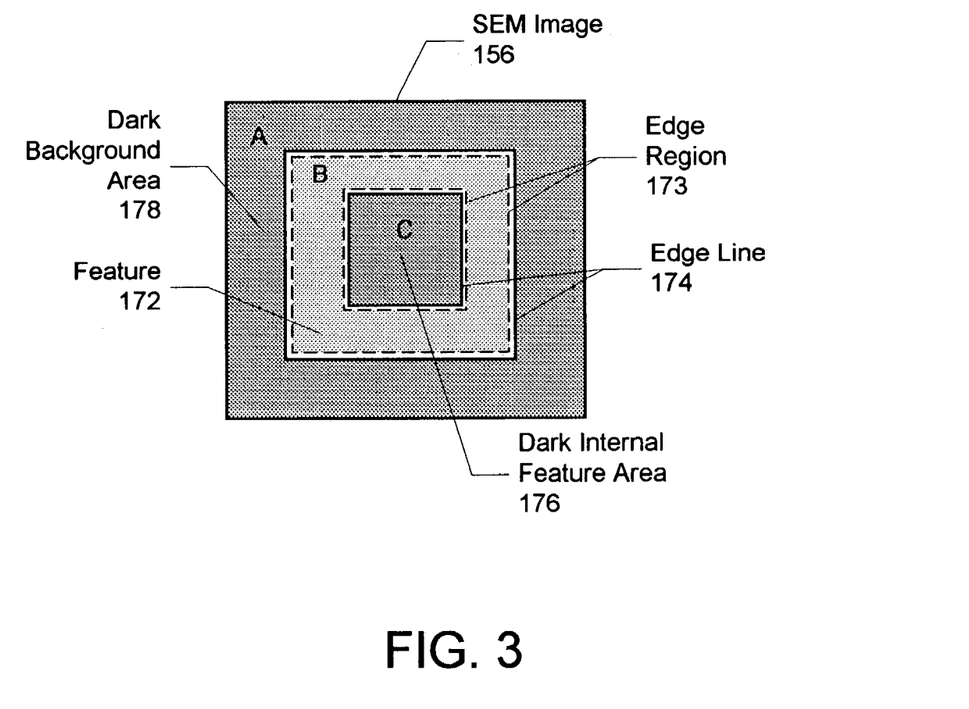
FIG. 3 is a diagram showing one portion of the example input SEM image shown in FIG. 2 in order to explain the terminology used herein.

FIG. 3 is a diagram showing a portion of the example SEM image 156 shown in FIG. 2 in order to explain the terminology used herein. This portion of the SEM image 156 includes one feature 172, which resembles an open square. Thus, this portion of the SEM image 156 has 3 areas: (A) dark background 178, (B) a bright ring representing the feature 172, and (C) a dark internal area 176 inside the feature 172. The brightness of the dark background and internal feature areas 178 and 176 can differ or can be approximately the same, depending on technology used and layer depicted in the image 156. In this example, the goal of the edge recognition algorithm is to find the edge lines 174 separating areas (A) and (B), and (B) and (C). In order to do this, however, the algorithm must first detect the edge regions 173 of the edge lines 174 separating areas (A) and (B), and (B) and (C).

Figure 4A:
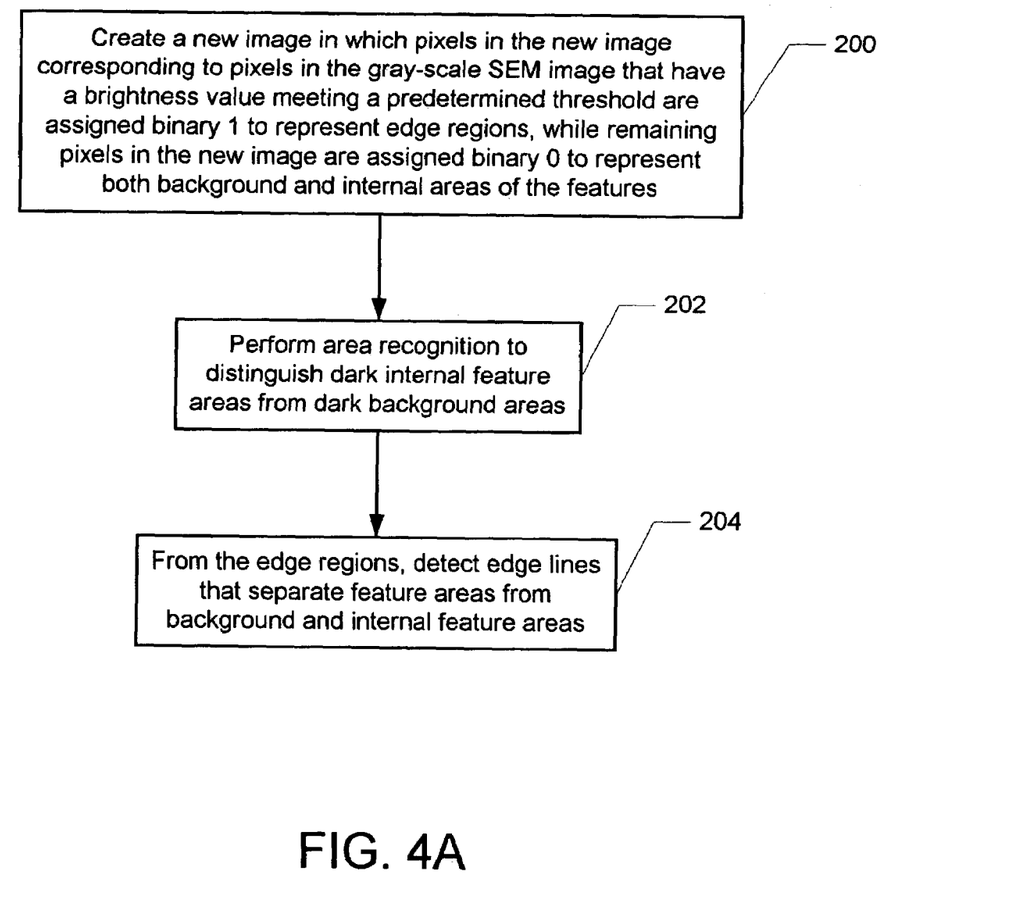
FIG. 4A is a flow chart illustrating the process for adaptively recognizing SEM edges in a preferred embodiment of the present invention.

FIG. 4A is a flow chart illustrating the process for adaptively recognizing SEM edge lines 174 in a preferred embodiment of the present invention. The adaptive SEM edge recognition process performed by application 152 operates in two major phases. In the first phase 200, the edge regions 173 of the features 172 in the SEM image 156 are recognized by creating a new image in which pixels in the new image corresponding to pixels in the gray-scale SEM image 156 that have a brightness value meeting a predetermined threshold are assigned one binary value (e.g., binary 1) to represent edge regions 173, while the remaining pixels in the new image are assigned another binary value (e.g., binary 0) to represent both background and internal areas of the features. In a preferred embodiment, the edge regions 173 are represented as 1-pixels (black) in the new image following the rule that A pixel (x, y) of the SEM image 156 belongs to an edge region 173 if its brightness B(x, y) is higher than a predetermined threshold. The remaining areas of the new image are filled with 0-pixels, as shown in FIG. 4B.

Figure 4B:
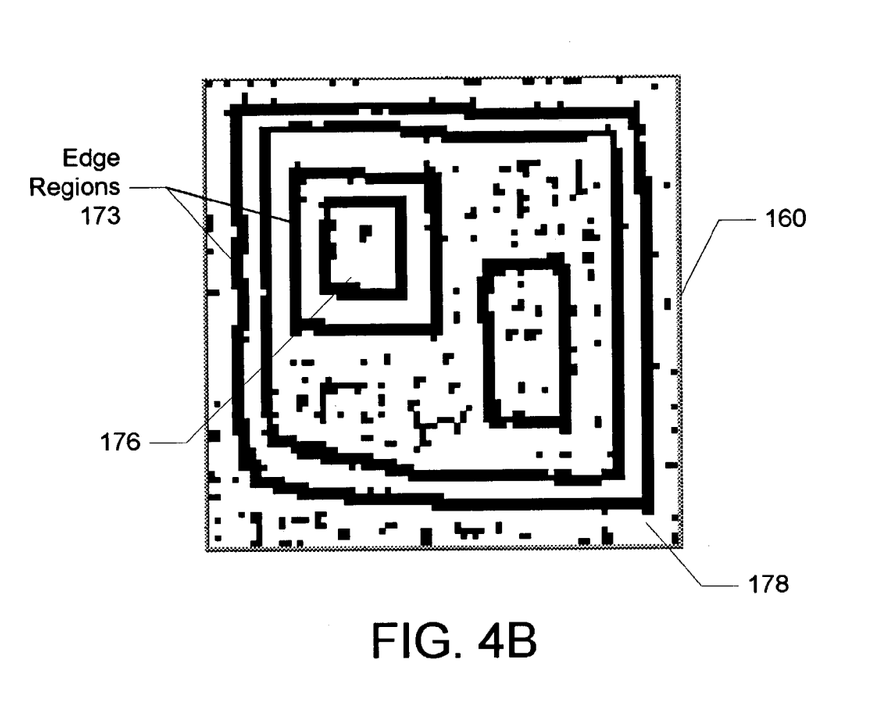
FIG. 4B is a diagram of an example new image created by application from the SEM image during the first phase of the recognition process.

FIG. 4B is a diagram of an example new image 160 created by application 152 for the SEM image 156 during the first phase 200 of the recognition process. Edge regions 173 are shown in black and background areas 178 and 176 are shown in white. The new image 160 is shown including many black small objects, which will be subsequently removed during the recognition process.

In a preferred embodiment, the edge region detection phase 200 of the adaptive SEM edge recognizer application 152 is human-assisted (interactive) and is based on a 1-level perception algorithm, as described further below.

Referring again to FIG. 4A, after the edge regions 173 are identified, the second phase 202 of the process performs area recognition in which the dark internal feature areas 176 in the SEM image 156 are distinguished from background areas 178.

Figure 4C:
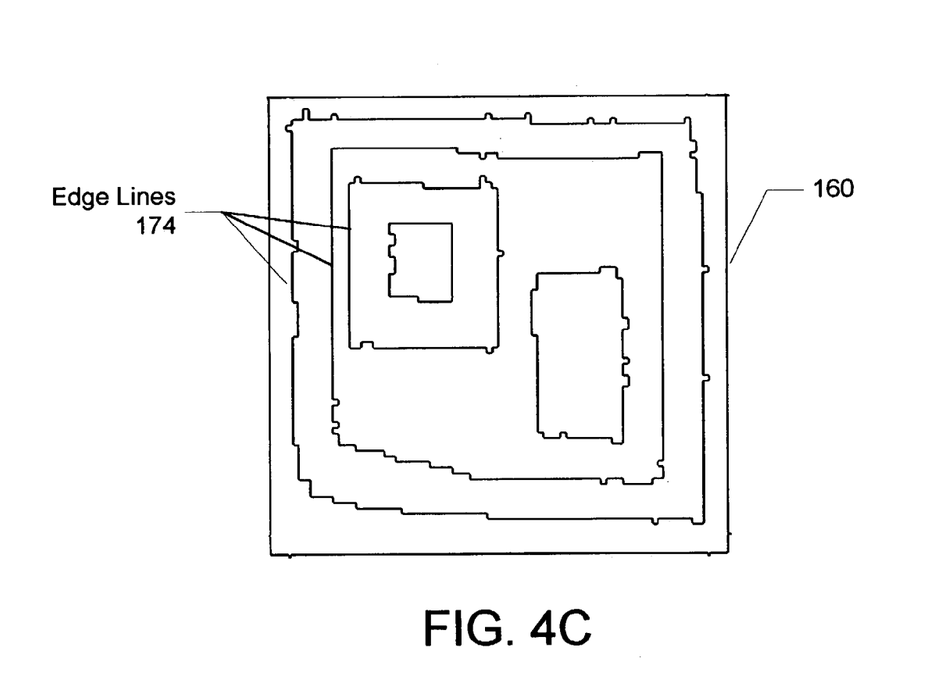
FIG. 4C is a diagram of the new image after the approximate location of the edge lines have been identified from the edge regions.

In step 204, the last step of the edge recognition process is to detect the edge lines 174 from the edge regions 173 that separate the feature 172 from the dark background and internal feature areas 178 and 176, as shown in FIG. 4C. FIG. 4C is a diagram of the new image 160 after the approximate location of the edge lines 174 have been identified from the edge regions 173.

Figure 5:
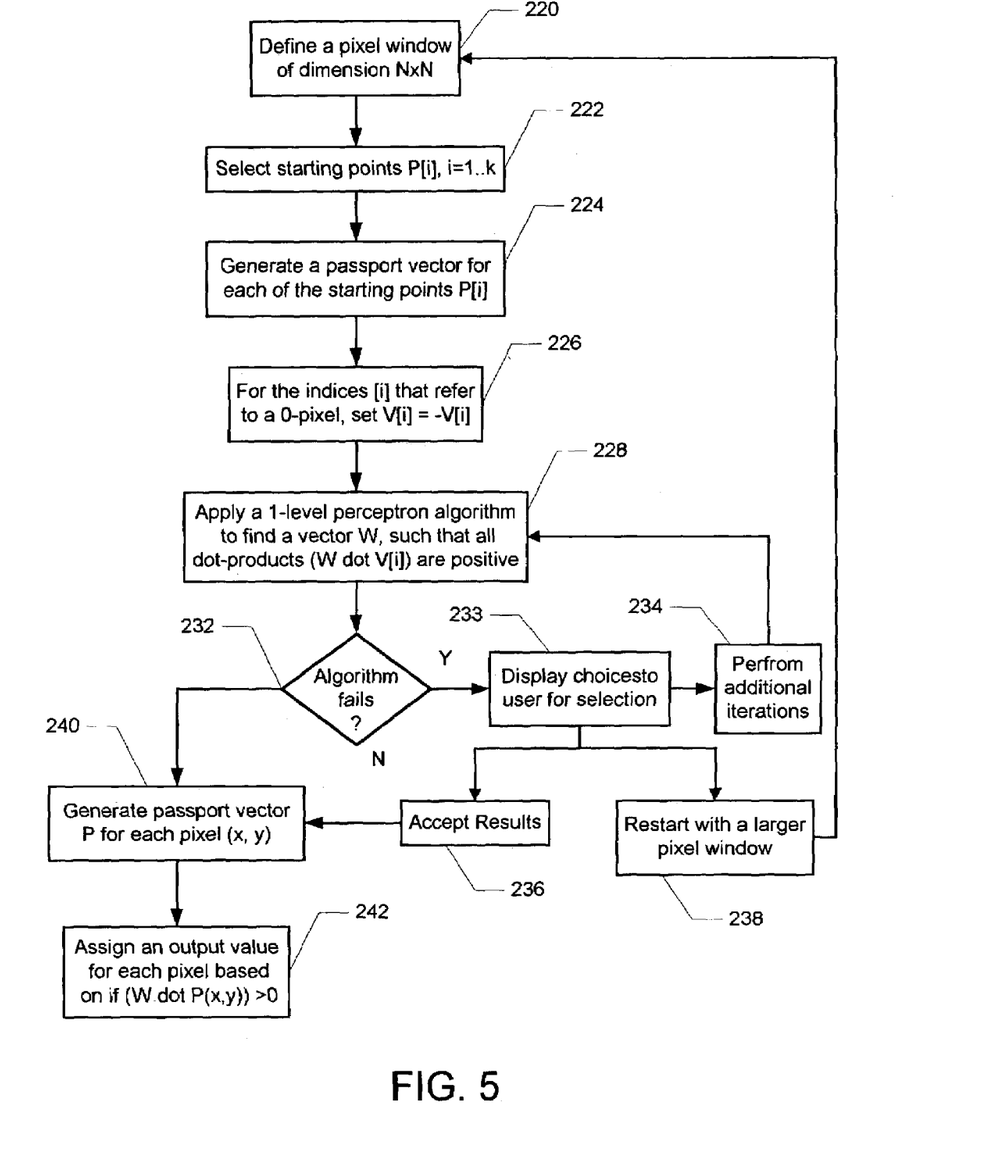
FIG. 5 is a flow chart illustrating the edge region detection phase of the adaptive SEM edge recognition process in further detail.

FIG. 5 is a flow chart illustrating the edge region detection phase 200 of the adaptive SEM edge recognition process in further detail. As stated above, the new image 160 is created from the gray-scale values of the pixels in the SEM image 156. According to one aspect of the present invention, each pixel in the new image 160 is associated with binary 0 or binary 1 based on the brightness values of the corresponding current pixel in the SEM image 156, and pixels surrounding the current pixel. Therefore, the first step 220 is to initialize a pixel window for use in the SEM image 156 of dimension N×N (where N is an odd integer) so that the decision to assign either a 0 or 1 value to each pixel in the new image 160 is done based on the brightness of an $N^2$ neighborhood of the corresponding pixel in the SEM image 156.

Figure 6:
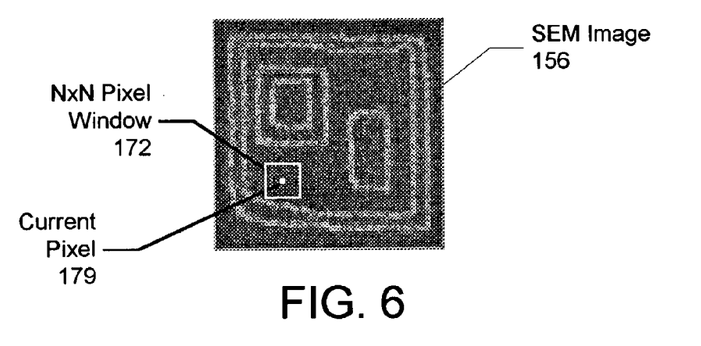
FIG. 6 is a block diagram of the SEM image in which a current pixel forms the center of an N×N pixel window.

FIG. 6 is a block diagram of the SEM image 156 in which a current pixel 179 forms the center of an N×N pixel window 172. The initial value for N is preferably 1, then if recognition fails, the value for N may be incremented to 3, and so on. Larger values of N result in longer computations and larger human interactions, but can include increasingly worse input data. The initial value for N may be automatically initialized by the application 152, or selected by an operator at the prompt of the application 152.

Referring again to FIG. 5, after the pixel window 172 is defined, in step 222 a few 0-pixels and 1-pixels within the SEM image 156 are selected as starting points P[i], i=1 . . . k.

Figure 7:
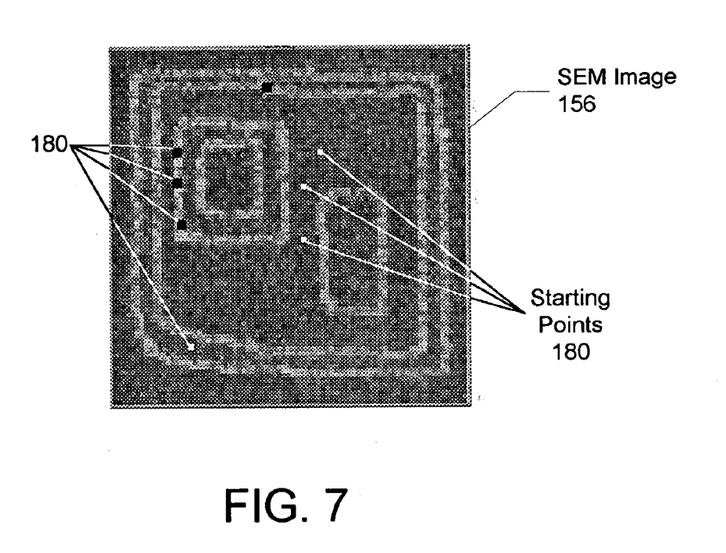
FIG. 7 is a diagram of the SEM image showing example starting points.

FIG. 7 is a diagram of the SEM image 156 showing example starting points 180. Each of the starting points 180, P[i], i=1 . . . k, has coordinates x[i], y[i] and brightness value B(x, y). In a preferred embodiment, the user will select the starting points 180 in the SEM image 156 by clicking a mouse. The starting points 180 should be placed in regions of the image 156 that are "definitely non-edge", as well as in "definitely edge" regions, as shown. After a short time using the program, the operator can easily get experience which choice of starting points will probably result in faster and better recognition. The only requirement is K>=2 (or, more precisely, at the beginning, the application 152 needs at least one 0-starting point and at least one 1-starting point).

Referring again to FIG. 5, in step 224 for each of the starting points P[i] a passport vector is generated containing brightness values of all pixels in the surrounding area within the pixel window 172 after some rearrangement. Initially, a variable, V[i] is set equal to the passport vector and then used during calculations as explained below.

Figure 8:
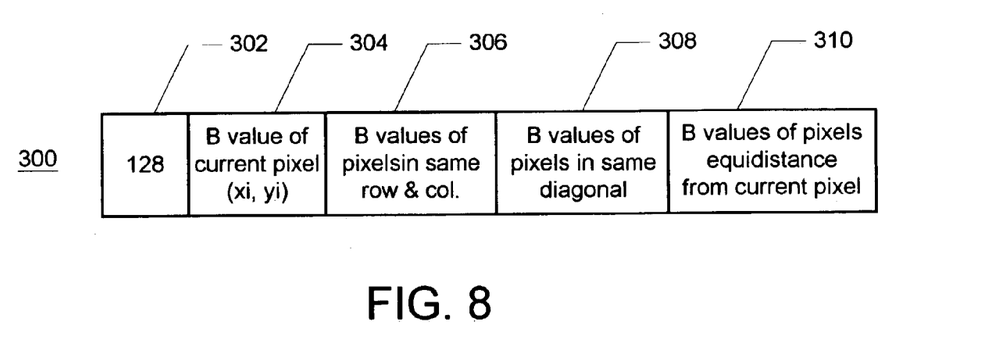
FIG. 8 is a diagram illustrating the format of a passport vector.

FIG. 8 is a diagram illustrating the format of a passport vector. In a preferred embodiment, the passport vector 300 for each point P(x,y) contains $N^2+1$ elements. The first element 302 is given a non-zero constant shown here as 128. The second element 304 is given the SEM brightness value of the current point P, which is B(x, y).

The next 4M elements 306 (where 4M represents four sides of the world motions: up, down, left and right, starting from the point (x, y)) contain M groups of values representing brightness values of pixels in the same row and column as the current pixel. More specifically, the i-th group (i=1 . . . M) of the passport vector 300 contains four values: B(x, y+i), B(x, y−i), B(x+i, y), B(x−i, y−1), These values are preferably arranged in non-decreasing order to make the algorithm learn faster. Without rearrangement of the values, the number of starting points will need to be significantly larger, because the algorithm will have to be taught separately for recognition of horizontal and vertical lines, for example.

The next 4M elements 308 also contain M groups of values representing brightness values of pixels in the same diagonals as the current pixel. More specifically, the i-th group contains four values: B(x+i, y+i), B(x+i, y−i), B(x−i, y+i), B(x−i, y−i), These values are preferable arranged in non-decreasing order.

The remaining 4M(M−1) elements 310 of passport vector V 300 contain M(M−1)/2 groups of values representing brightness values of pixels in groups having 8 tuples equidistance from the current pixel. More specifically, groups with indices (i, j), (i=1 . . . M−1, j=i+1 . . . M) contain eight values: B(x+i, y+j), B(x+j, y+i), B(x+i, y−j), B(x+j, y−i), B(x−i, y+j), B(x−j, y+i), B(x−i, y−j), B(x−j, y−i). These values are preferable arranged in non-decreasing order.

As an example of the above process consider, the following example where M=2 (i.e. N=5), and the 5*5 brightness matrix includes pixel values as follows:

A B C D E
F G H I J
K L M N O
P Q R S T
U V W X Y

According to the present invention, a passport vector with the following values will be created from the matrix:

$$\begin{aligned}\text{Passport Vector} = \\ &-a\text{ non-zero constant} \\ &-M \\ &-H, L, N, R \text{ (sorted in non-decreasing order)} \\ &-C, K, O, W \text{ (sorted in non-decreasing order)} \\ &-G, I, Q, S \text{ (sorted in non-decreasing order)} \\ &-A, E, U, Y \text{ (sorted in non-decreasing order)} \\ &-B, D, F, J, P, T, V, X \text{ (sorted in non-decreasing order)}\end{aligned}$$

Referring again to FIG. 5, after the passport vectors 300 have been generated for each of the starting points P, step 226 is performed in which for the indices [i] that refer to a 0-pixel, the vectors V[i] are inverted so that V[i] is replaced with −V[i]. Thereafter, in step 228 a conventional 1-level perceptron algorithm is applied to find a vector W, such that all dot-products (W·V[i]) are strictly positive.

Figure 11:
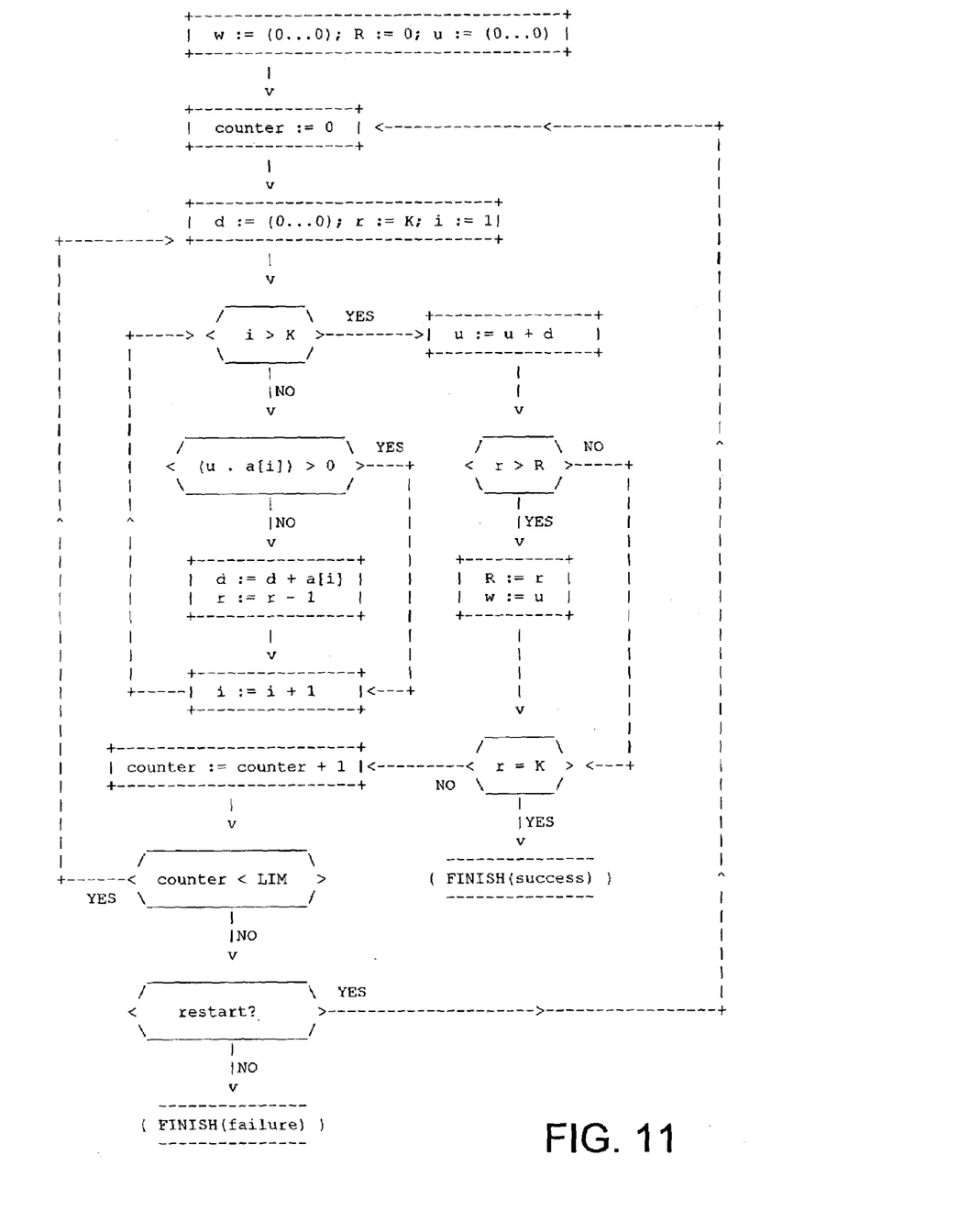
FIG. 11 is a diagram illustrating pseudo code for a perceptron algorithm.

As stated above, the perceptron algorithm is well-known. However, FIG. 11 is a diagram illustrating pseudo code for such an algorithm as an example. Inputs to the algorithm are as follows: a dimension n (n=N*N+1, where N is the window dimension). A list of n-dimensional vestors a[1] . . . a[K] with real coordinates, and a maximum number of iterations LIM. The outputs of the algorithm are as follows: a flag for "success" or "failure," and n-dimensional vector w. The internal variables are n-dimensional vectors u and d, and counters R and r.

The internal variables are n-dimensional vectors u and d, and counters R and r.

Referring again to FIG. 5, in step 232, if the perceptron algorithm fails to generate a vector W within a given number of iterations, then three possible actions are displayed to the user for selection in step 233. The user may choose to perform additional iterations of the perceptron algorithm in step 234, or accept the value for the vector W output by the perceptron algorithm in step 236, or can restart the adaptive SEM image recognizer application 152 with a larger pixel window in step 238.

Once an acceptable value for the vector W is obtained in step 232 or 236, the vector W is used as a decision rule for a 0 or 1 pixel classification of the SEM image 156 as follows: in step 240 a passport vector P is generated for each pixel (x, y) of the SEM image 156, not just the starting points. In step 242, the application 152 then assigns an output value for each pixel in the new black and white image 160 based on whether the dot product of its passport vector and W is positive or not:

if (W·P)>0, then output (x, y)=1 (black)

otherwise, output (x, y)=0 (white).

After the pixels assignments are complete, in step 244, the new image 160 is displayed to the user via a graphical user interface (GUI).

The user may accept the output picture as is, in which case the edge region detection phase 200 is completed. Or the user may change the 0-pixel and 1-pixel assignments in two different ways. First, the user can simply manually edit the result of recognition (for example, filling some tiny breaks in edge regions, or erasing 1-pixels to separate wrongly glued edge regions). After such an editing, the process is complete. Or the user can change the set of starting points, and then re-start the recognition process. In this case, the user typically will add the 1-points to edges in the "worst recognized" parts of the picture (where the edges appear to disappear). Also, 0-points can be added, if some parts of the recognized images are covered by unwanted "1-clouds". However, it may also be useful for the user to remove existing 0-points and/or 1-points in some circumstances. After the user finishes changing the set of starting points, the process continues at step 224.

Figure 9:
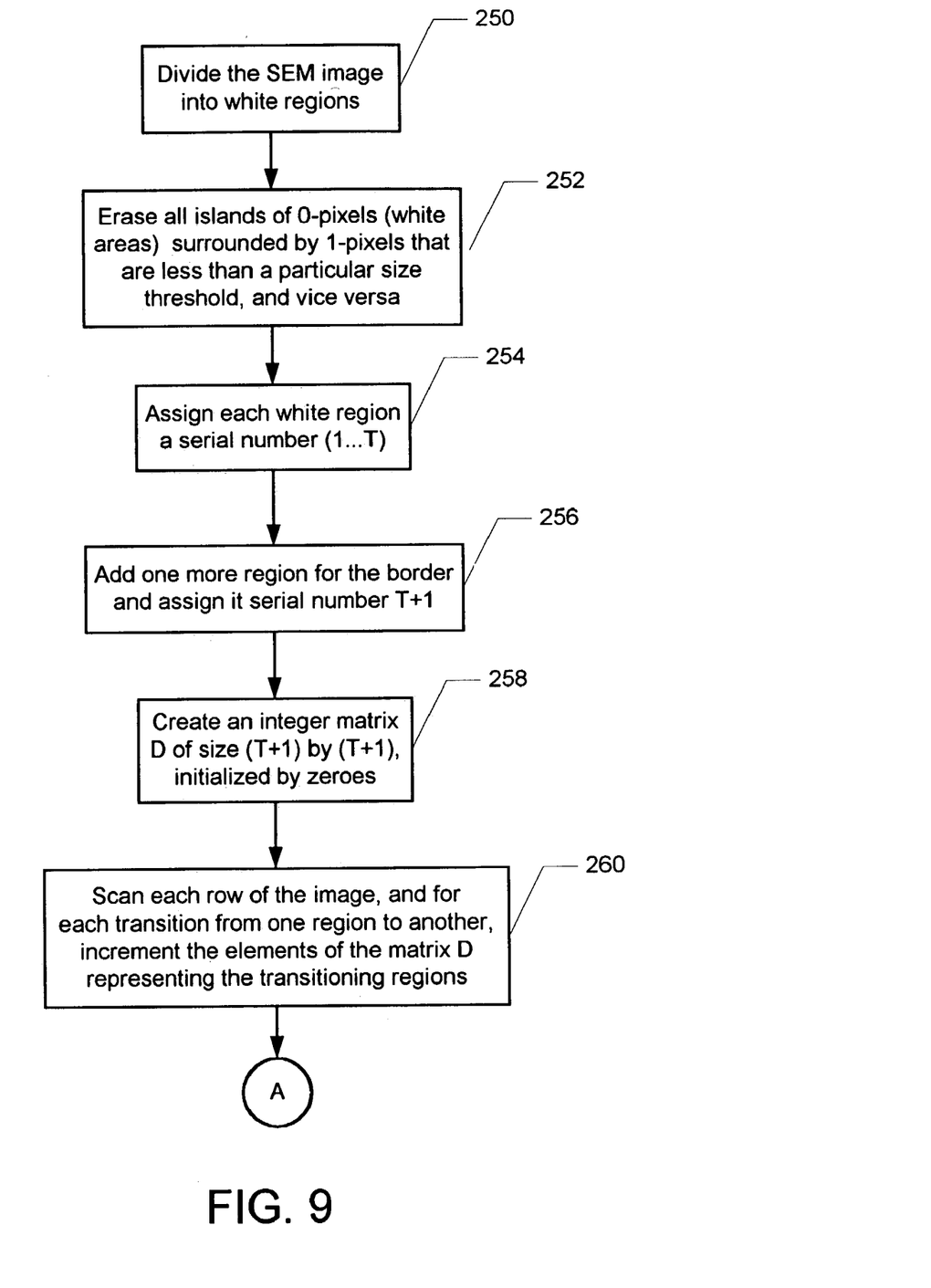
FIG. 9 is a flow chart illustrating the area recognition phase of the process in which internal feature areas are distinguished from background areas of the SEM image.

FIG. 9 is a flow chart illustrating the area recognition phase 202 of the process in which internal feature areas 176 are distinguished from background areas 178 of the SEM image 156. Once the edge regions 173 are found, the adaptive SEM edge recognizer 152 divides the SEM image 156 into several (white) regions in step 250, where each region is a separate group of all 0-pixels. This step includes organizing all these regions, black and white, into a list or array. For each region, white or black, its size (perimeter and area) is calculated.

In step 252, all islands of 0-pixels (white areas) surrounded by 1-pixels that are less than a particular size threshold are erased by the changing pixel values from 0 to 1 or from 1 to 0, and vice versa, all small islands of 1-pixels (black areas) surrounded by 0-pixels are erased by the changing pixel values. The size threshold defines a minimum area and/or minimum perimeter for features.

In step 254 each white region is identified by assigning consecutive serial numbers to each white region. Assuming the total number of white regions is T, then the white regions are numbered from 1 to T.

In step 256 one more white region is formally added and assigned serial number T+1. The addition of this new white region is necessary to define the region of background pixels that extend to the border of the image. If X and Y are the actual SEM image's dimensions, then white region T+1 would contain the pixels in the image outside the other white regions within coordinates (−1, y), (x, −1), (X, y), (x, Y), where x=0 . . . X−1 and y=0 . . . Y−1.

Figure 10:
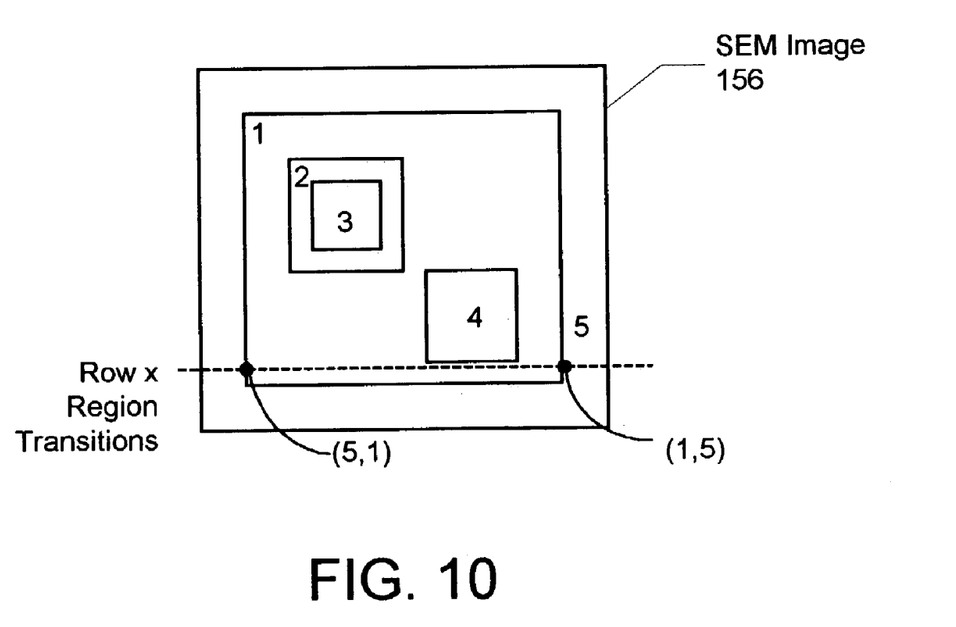
FIG. 10 is a simplified diagram of the SEM image in which white regions of 0-pixels have been identified.

FIG. 10 is a simplified diagram of the SEM image 156 in which white regions of 0-pixels have been identified. For example, the process has discovered four regions of white pixels surrounded by black pixels (edge regions 173), thus T=4. Accordingly, the white regions have been assigned serial numbers 1–4. Serial number 5 has been assigned to the white regions of pixels extending to the image border.

Referring again to FIG. 9, after the white regions have been identified, in step 258, an integer matrix D of size (T+1) by (T+1) is created. Each row and column of the matrix represents one of the regions identified in the SEM image 156. In step 260, each row of the image is scanned, and for each transition from a series of 0-pixels (belonging to white region number "i") to a series of 1-pixels followed by transition from this series of 1-pixels to a series of 0-pixels (belonging to white region number "j") the elements D[i,j] and D[j,i] of the matrix D are incremented by 1. Note, this series of 1-pixels can be of length 0, if i=T+1 or j=T+1, because the artificially added (T+1)-th region can, in general, directly "touch" old white regions. Also note that values of D[i,i] will not be used, and can be calculated in any way (or not calculated at all).

In FIG. 10, for example, it can be seen that row x has two 0-11 . . . 11-0 transitions, from region 5 to region 1, and then from region 1 to region 5. Thus, if i and j are the serial numbers of the transitioning regions, then elements D[i, j] and D[j, i] are incremented by one. Referring again to FIG. 8 after the rows are scanned, in step 262 each column of the image 156 is scanned and the same process is repeated.

After the total number that each region transitions to another has been counted and stored in matrix D, the classification of whether a region is background or an interior feature is solved. This is accomplished in step 264 by finding a vector A of dimension T+1 having a combination of values +1 and −1, such that A [T+1]=+1, and where the sum $$\sum_{\substack{i,j=1,\\ i\neq j}}^{T+1} D[i,j] \cdot A[i] \cdot A[j]$$

is minimal. Note, if T≦20, this problem can be solved by brute force analysis of all possible cases, but for larger values of T, a more efficient method may be necessary, such as the well-known "branch-and-bound" method.

In step 266, if A[i]=+1, then the i-th region is classified as background. And if A[i]=−1, in step 268 the i-th region classified as an internal area of a feature. In step 270, this recognition result in displayed to the user for acceptance orcorrection (e.g., by manually changing the assigned region type). In step 272, pixel values in the new image 160 of regions classified as internal areas are than changed from 0 to 1. Now 0's define background areas, and 1's define features together with their edges. The last step of the adaptive SEM edge recognition application 152 is to output the set of edge lines 174 separating the background from the features areas 178 and 176 in step 274.

A method and system for recognizing feature edges in an SEM image has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A computer-implemented method for recognizing edges in a scanning electron microscope (SEM) digital image, the image having a plurality of pixels with gray-scale values defining features, the method comprising:

recognizing edge regions of the features in the SEM digital image by creating a new image in which pixels in the new image corresponding to pixels in the gray-scale image that have a brightness value meeting a predetermined threshold are assigned a first binary value to represent edge regions, while remaining pixels in the new image are assigned a second value to represent both background and internal areas of the features;

performing area recognition to distinguish internal feature areas from background areas;

detecting edge lines that separate features from background areas and internal feature areas;

determining a brightness level of each pixel based on brightness levels of a plurality of pixels within an N×N pixel window surrounding each respective pixel selecting pixels within the SEM image as starting points P[i], i=1 . . . k; and generating a passport vector for each of the starting points P[i] that contains brightness values of different groups of surrounding pixels.

2. The method of claim 1 wherein the recognizing further includes: assigning either binary 1 or binary 0 to the pixels in the new image.

3. A computer-implemented method for recognizing edges in a scanning electron microscope (SEM) digital image, the image having a plurality of pixels with gray-scale values defining features, the method comprising:

recognizing edge regions of the features by creating a new image in which pixels in the new image corresponding to pixels in the gray-scale image that have a brightness value meeting a predetermined threshold are assigned a first binary value to represent edge regions, while remaining pixels in the new image are assigned a second value to represent both background and internal areas of the features, wherein the recognizing comprises:

assigning either binary 1 or binary 0 to the pixels in the new image, determining a brightness level of each pixel based on brightness levels of a plurality of pixels within an N×N pixel window surrounding each respective pixel, selecting 0-pixels and 1-pixels within the SEM image as starting points P[i], i=1 . . . k . . . , and generating a passport vector for each of the parting points P[i] that contains brightness values of different groups of surrounding pixels, wherein each passport vector includes a non-zero constant, a brightness value of a current pixel, brightness values of pixels in a same row and column in the image as the current pixel, brightness values of pixels in a same diagonals as the current pixel, and brightness values of pixels in groups of pixels equidistance from the current pixel;

performing area recognition to distinguish internal feature areas from background areas; and detecting edge lines that separate features from background areas and internal feature areas.

4. The method of claim 3 wherein the recognizing further includes: setting respective vectors V[i] equal the passport vectors, and applying a perceptron algorithm to find a vector W, such that all dot-products (W·V[i]) are positive.

5. The method of claim 4 wherein the recognizing further includes: generating a passport vector P for each pixel (x, y) of the image, and assigning an output value for each pixel as follows:

if (W·P)>0, then output (x, y)=1 otherwise, output (x, y)=0.

6. The method of claim 5 wherein the recognizing further includes: after assigning a 0, or 1 to each pixel, displaying the new image to a user, and allowing the user to change the 0 and 1 pixel assignments.

7. The method of claim 1 wherein the recognizing further includes: allowing the user to change the 0 and 1 pixel assignments by manually changing pixel values or by changing a set of starting points and re-starting the recognition process.

8. The method of claim 7 wherein the performing further includes: identifying each region by assigning serial numbers to each region.

9. The method of claim 8 wherein the performing further includes: assuming a total number of regions is T, adding an additional region to define a region of background pixels that extend to a border of the image.

10. The method of claim 9 wherein the performing further includes: creating a matrix D of size (T+1) by (T+1), where each row and column of the matrix represents one of the identified regions.

11. The method of claim 10 wherein the performing further includes: scanning each row of the image, and for each transition from a series of 0-pixels that represents white region number i, to a series of 1-pixels followed by transition from this series of 1-pixels to a series of 0-pixels that represents white region number j, incrementing elements D[i,j] and D[j,i] of the matrix D by 1.

12. The method of claim 11 wherein the performing further includes: classifying each region as background, or as an interior of a feature by finding a vector A of dimension T=1 having a combination of values +1 and −1, such that A[T+1]=+1, and a sum $$\sum_{\substack{i,j=1,\\i\neq j}}^{T+1} D[i,j] \cdot A[i] \cdot A[j]$$

is minimal.

13. The method of claim 11 wherein the performing further includes: if A[i]=+1, then classifying an i-th region as background, and if A[i]=−1 classifying the i-th region as an internal area of a feature.

14. The method of claim 12 wherein the detecting further includes: changing the pixel values in the new image for regions classified as internal areas features from 0 to 1 so that 0's define background areas and 1's define features together with their edges.

15. The method of claim 12 wherein the detecting further includes: outputting a set of edge lines separating the background from the features areas.

* * * * *